(12) United States Patent
Watanabe et al.

(10) Patent No.: US 11,716,199 B2
(45) Date of Patent: *Aug. 1, 2023

(54) BLOCKCHAIN GENERATION APPARATUS, BLOCKCHAIN VERIFICATION APPARATUS, AND PROGRAM

(71) Applicant: Nippon Telegraph and Telephone Corporation, Tokyo (JP)

(72) Inventors: Hiroki Watanabe, Yokosuka (JP); Akihito Akutsu, Yokosuka (JP); Yasuhiko Miyazaki, Yokosuka (JP); Atsushi Nakadaira, Yokosuka (JP); Shigeru Fujimura, Yokosuka (JP); Junichi Kishigami, Muroran (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/367,791

(22) Filed: Jul. 6, 2021

(65) Prior Publication Data

US 2021/0336785 A1 Oct. 28, 2021

Related U.S. Application Data

(63) Continuation of application No. 15/770,803, filed as application No. PCT/JP2016/083062 on Nov. 8, 2016, now Pat. No. 11,139,972.

(30) Foreign Application Priority Data

Nov. 9, 2015 (JP) ................................ 2015-219424

(51) Int. Cl.
*H04L 9/00* (2022.01)
*H04L 9/32* (2006.01)
(Continued)

(52) U.S. Cl.
CPC ........... *H04L 9/321* (2013.01); *G06Q 20/065* (2013.01); *G06Q 20/0658* (2013.01);
(Continued)

(58) Field of Classification Search
CPC ......... H04L 9/321; H04L 9/50; H04L 9/0643; H04L 9/3247; H04L 2209/56;
(Continued)

(56) References Cited

U.S. PATENT DOCUMENTS 9,875,510 B1 * 1/2018 Kasper .................. G06Q 40/12
10,354,325 B1 * 7/2019 Skala .................. G06Q 20/065
(Continued)

OTHER PUBLICATIONS

Davarpanah et al., "NeuCoin: the First Secure, Cost-efficient and Decentralized Cryptocurrency", Version 1.0, Mar. 25, 2015, 39 pages.
(Continued)

*Primary Examiner* — Allen S Lin
(74) *Attorney, Agent, or Firm* — Kilpatrick Townsend & Stockton, LLP

(57) ABSTRACT

The blockchain generation apparatus 1 includes: a parameter calculator 122 that identifies a parameter type to be used for linkage of the new block, based on block approval method data 114, and calculates a value for the identified parameter type based on transaction datasets which are related to an identifier of a generating party; a block generation condition checker 125 that determines whether the generating party is qualified to generate the new blockchain data, based on the value calculated by the parameter calculator 122; and a blockchain generator 126 that tries to generate the new blockchain by referring to the shared data when the block generation condition checker 125 determines that the generating party is qualified. An identifier of the blend pattern included in the block approval method data 114 specifies a
(Continued)

combination of the plurality of parameter types that conflict with each other.

7 Claims, 10 Drawing Sheets

(51) Int. Cl.
    *G06Q 20/22*         (2012.01)
    *G06Q 20/06*         (2012.01)
    *H04L 9/06*          (2006.01)

(52) U.S. Cl.
    CPC .......... *G06Q 20/223* (2013.01); *H04L 9/0643* (2013.01); *H04L 9/3247* (2013.01); *H04L 9/50* (2022.05); *H04L 2209/56* (2013.01); *Y02P 80/15* (2015.11)

(58) Field of Classification Search
    CPC ............. G06Q 20/065; G06Q 20/0658; G06Q 20/223; Y02P 80/15
    See application file for complete search history.

(56) References Cited

U.S. PATENT DOCUMENTS

| | | |
|---|---|---|
| 10,790,963 B2 | 9/2020 | Watanabe et al. |
| 2015/0046337 A1 | 2/2015 | Hu et al. |
| 2015/0332283 A1 | 11/2015 | Witchey |

OTHER PUBLICATIONS

Anonymous, "White Paper. ethereum/wiki Wiki.GitHub", retrieved from the Internet: https://web.archive.org/web/20150611185326/ https://github.com/ethereum/wiki/wiki/White-Paper, Jun. 11, 2015, pp. 1-5, 8-16.
Bitcoin: Digital Megalithic Currency Without Human Intervention, Dec. 31, 2013.
Bonneau, "How Long Does it Take for a Bitcoin Transaction to be Confirmed?", https://coincenter.org/entry/how-long-does-it-take-for-a-bitcoin-transaction-to-be-confirmed, Nov. 3, 2015, 4 pages.
FinTech Kin'yu o Kaeru nowa Ginko dewa Nai, Nikkei Computer, Aug. 4, 2015, No. 892, pp. 28-31, ISSN 0285-4619.
Anonymous, "Proof-of-Stake—Wikipedia", Oct. 4, 2015, Retrieved from the Internet: https://en.wikipedia.org/w/index.php?title=Proof-of-stake&oldid=684102318.
Proof-of-stake (PoS), Kurage no Changelog, Aug. 11, 2014.
*U.S. Appl. No. 15/770,803 , Advisory Action, dated Nov. 3, 2020, 5 pages.
*U.S. Appl. No. 15/770,803 , Final Office Action, dated Jul. 30, 2020, 19 pages.
*U.S. Appl. No. 15/770,803 , Non-Final Office Action, dated Apr. 23, 2020, 13 pages.
*U.S. Appl. No. 15/770,803 , Notice of Allowance, dated Apr. 26, 2021, 17 pages.
Beikverdi, "Proof of Importance: How NEM is Going to Add Reputations to the Blockchain", Cointelegraph. The Future of Money, Mar. 13, 2015, Retrieved from the Internet: https://cointelegraph.com/news/proof-of-importance-nem-is-going-to-add-reputations-to-the-blockchain.
European Supplementary Search Report, European Patent Application No. 16864198.3, dated Mar. 25, 2019.
Office Action, European Patent Application No. 16864198.3, dated Dec. 3, 2019, 12 pages.
Summons to Attend Oral Proceedings Pursuant to Rule 115(1) EPC, European Patent Application No. 16864198.3, mailed Jun. 19, 2020, 13 pages.
Fuchita, "Innovation to Kni'yu", Nomura Capital Markets Quarterly Autumn 2015, Nov. 1, 2015, vol. 19, No. 2, pp. 11-35, ISSN 2185-4629.
Nakamoto, Nihongo de Rikai suru, Bitcoin Genronbun, May 6, 2015.
International Preliminary Report on Patentability, PCT Application No. PCT/JP2016/083062, dated May 24, 2018.
International Search Report, PCT Application No. PCT/JP2016/083062, dated Jan. 31, 2017.
Tschorsch et al., "Bitcoin and Beyond: A Technical Survey on Decentralized Digital Currencies", International Association for Cryptologic Research, vol. 20150517:090557, May 15, 2015, pp. 1-37.

\* cited by examiner

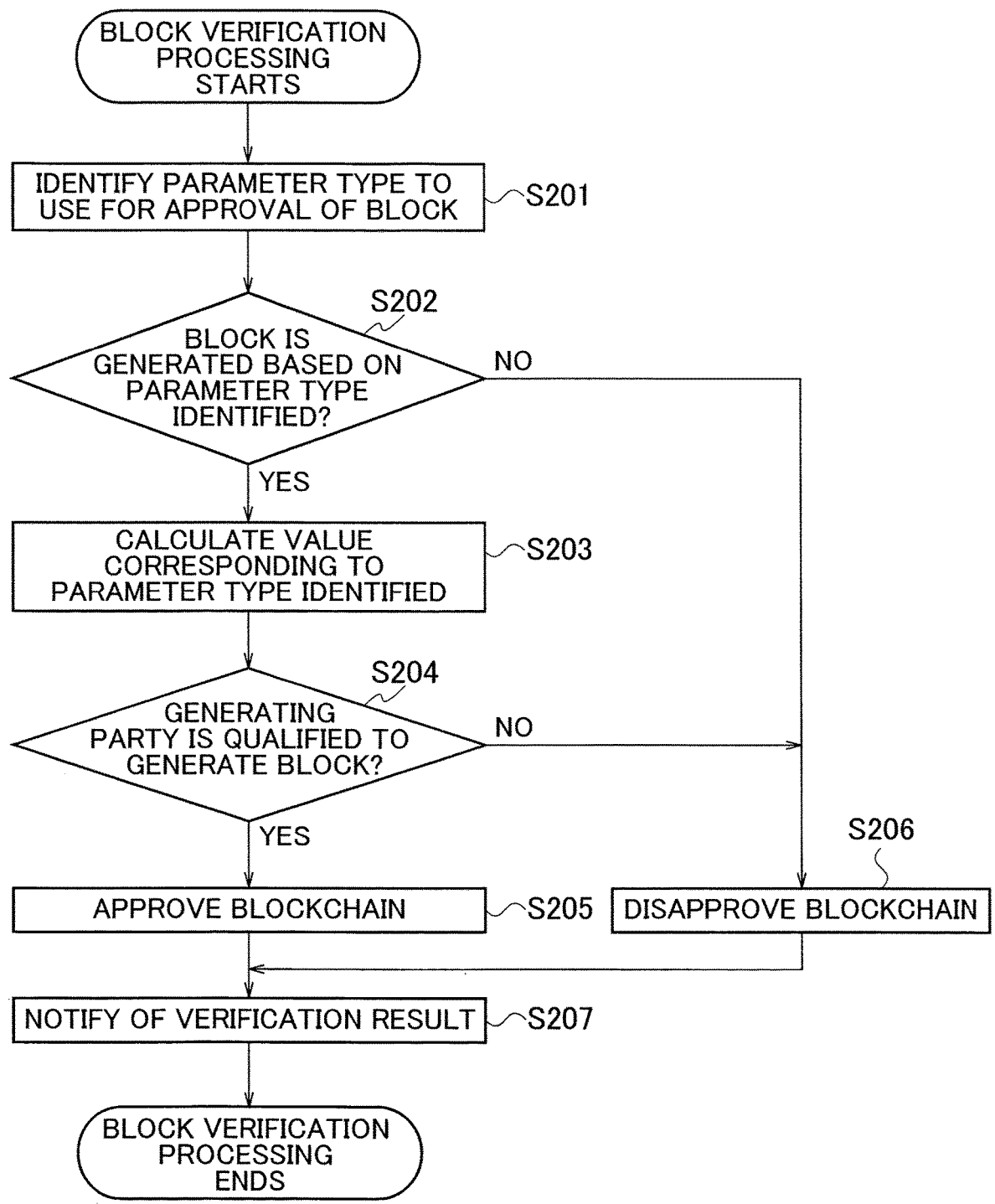

FIG. 9

(a) BLEND PATTERN IN WHICH TWO APPROVAL METHODS ALTERNATE WITH EACH OTHER

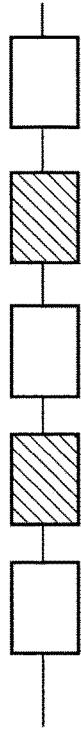

(b) BLEND PATTERN IN WHICH N BLOCKS ARE SUCCESSIVELY LINKED AND FOLLOWED BY BLOCK OF DIFFERENT APPROVAL METHOD
(N=3)

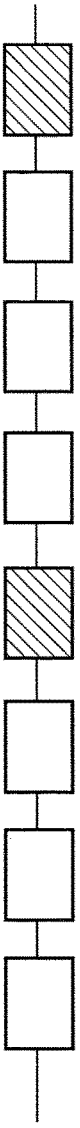

(c) BLEND PATTERN IN WHICH N BLOCKS ARE SUCCESSIVELY LINKED AND FOLLOWED BY M BLOCKS OF DIFFERENT APPROVAL METHOD
(N=3, M=2)

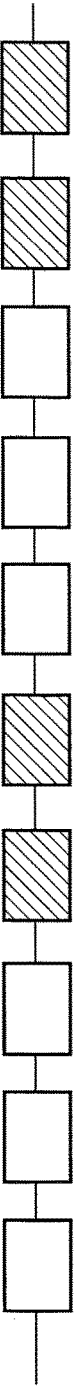

(d) BLEND PATTERN IN WHICH ONE OF SUCCESSIVE N BLOCKS IS OF DIFFERENT APPROVAL METHOD
(i.e., N SAME BLOCKS ARE NOT LINKED SUCCESSIVELY)
(N=6)

(e) ONE OF APPROVAL BLOCK NUMBER OF SUCCESSIVE BLOCKS IS OF DIFFERENT APPROVAL METHOD
(i.e., APPROVAL BLOCK NUMBER OF SAME BLOCKS ARE NOT LINKED SUCCESSIVELY)

FIG. 10

(a)
- GROUP OF PATH PATTERNS PREVIOUSLY ISSUED BY GIVEN PARTICIPANT : a
- NUMBER OF NODES INCLUDED IN GIVEN PATH PATTERN p INCLUDED IN a : $n_{p,a}$
- SUM OF NUMBERS OF NODES IN ALL PATH PATTERNS IN a : $score(a) = \sum_{s \in a} n_{s,a}$ ···FORMULA (1)

(b) GROUP OF PATH PATTERNS PREVIOUSLY ISSUED BY PARTICIPANT A

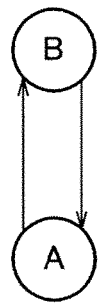 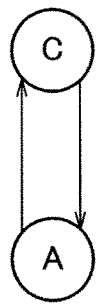 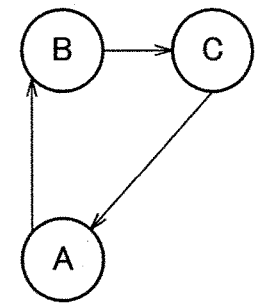

NUMBER OF NODES n=1　　　n=1　　　n=2

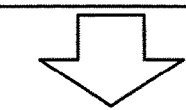

Score = 1 + 1 + 2 = 4

(c) EXAMPLE CONDITIONAL EXPRESSION FOR APPROVED PARTY'S address
SHA256(prevhash + address + timestamp) $\leq 2\hat{\ }256 * score(a)/difficulty$

BLOCKCHAIN GENERATION APPARATUS, BLOCKCHAIN VERIFICATION APPARATUS, AND PROGRAM

CROSS-REFERENCE TO RELATED APPLICATIONS

This application is a continuation of U.S. Ser. No. 15/770,803, which is incorporated by reference herein in its entirety. U.S. Ser. No. 15/770,803 is related to U.S. application Ser. No. 15/770,851, now issued as U.S. Pat. No. 10,790,963, for Blockchain Generation Apparatus, Blockchain Generation Method, Blockchain Verification Apparatus, Blockchain Verification Method, and Program.

TECHNICAL FIELD

The present invention relates to: a blockchain generation apparatus and a blockchain generation method that generate blockchain data which is a chain of blocks each including transaction datasets generated by a plurality of transaction generation apparatuses; a blockchain verification apparatus and a blockchain verification method that verify the blockchain data; and a program.

BACKGROUND ART

A digital virtual currency such as Bitcoin (registered trademark) is used more and more these days. For such a virtual currency, a mechanism for allowing credibility to be assured without needing centralized management is introduced. For a virtual currency such as Bitcoin (registered trademark), technology called blockchain is used. Blockchain technology assures credibility of information exchanged between participants by using a consensus forming process in a network formed by all the participants. Blockchain technology also maintains soundness of the blockchain by preventing fraud, such as falsification and double spending, with the entire system. Information pieces on transactions of a virtual currency between participants (transactions) are bundled together into a unit called a block, and blocks form the blockchain. The blockchain functions as one gigantic ledger shared by all the participants on a P2P (Peer to Peer) network.

According to Non-patent Document 1, the blockchain uses digital signatures as illustrated in FIG. 2, and represents coin's transactional information with a chain of signatures.

For a digital virtual currency using the blockchain mechanism, on behalf of the terminals participating in the network, one of them collects and approves transaction datasets broadcast to the network, generates a block including the transaction datasets, and notifies the other terminals. Then, the entire system, or more specifically, a plurality of terminals other than the one that generated the block verify that this process is not illegitimate. The terminal that generates a block needs costs for generating the block, but can obtain a new coin as a reward for generating the block. Thus, there is a competitive process acting among the participants to try to gain the right to generate a block.

When a plurality of terminals generate blocks at the same time, the blockchain may branch into two or more chains. In such a case, the chain with the most blocks linked thereafter is set as the official chain. Thus, the blockchain generated at the highest cost is selected as the only blockchain to be shared. For this reason, to get through falsification or double spending, an attacker must link more blocks than those in other blockchains, and needs to spend more costs accordingly. This makes an attack difficult.

Various approaches have been proposed regarding costs provided by participants when they generate blocks. Examples of the proposed approaches include what is called Proof of Work (PoW) and what is called Proof of Stake (PoS). In PoW, a participant who solves a mathematical problem most quickly generates a block. To solve the problem, the participant provides a computational power as a cost. PoW, however, has a problem of unproductiveness and wasteful consumption of electricity resources since a participant solves a problem only for receiving a reward.

To overcome such a problem, PoS has been proposed as an approach to replace PoW. PoS grants the right to generate a block to a participant who meets a mathematical condition. It is known that the difficulty based on which it is determined whether a participant meets the condition is adjusted according to the number of coins saved and owned by the participant (Kourosh Davarpanah, Dan Kaufman, Ophelie Pubellier "NeuCoin: the First Secure, Cost-efficient and Decentralized Cryptocurrency", [online], Jun. 15, 2015, <URL: http://www.neucoin.org/en/whitepaper/download> searched on the Internet on Oct. 20, 2015). Specifically, PoS grants the right (qualification) to generate a block to a participant who meets a mathematical condition. Since the difficulty of the condition is adjusted according to the number of coins owned by a participant, the more coins a participant owns, the more likely the participant gets to generate a block. Specifically, a hash value of a value including the address of a participant, a hash value of the previous block, and the current time is computed, and under the condition where the hash value falls below a value which is proportional to the number of coins saved, the participant is granted the right to generate a block. The determination on the condition is carried out once a second by including the current time in parameters. In such PoS, participants provide the risk of holding a large number of coins as a cost.

Meanwhile, for the blockchain, there is an attack method called "51% attack", which is used to make an illegitimate payment or to tamper with past histories. In this attack method, when malicious attackers control 51% or more of the overall block generation rate, the legitimate block generation rate is overtaken, and it is believed that theoretically, the fraud succeeds. The block generation rate is proportional to the size of resources provided by PoW or PoS. For example, it is believed that attack is feasible by domination of 51% or more of the computer powers in the case of PoW and by domination of 51% or more of the total number of coins in the case of PoS.

PRIOR ART DOCUMENT

Non-Patent Document

Non-patent Document 1: Kenji Saito, "Bitcoin: Digital Megalithic Currency Without Human Intervention", WIDE Technical Report

SUMMARY OF THE INVENTION

Problem to be Solved by the Invention

Today, with the advent of a mining pool, which aggregates computer powers and generates blocks organizationally, and the advent of integrated circuits using ASICs or the like exclusively for PoW, domination of 51% or more of computer resources is not so far from becoming reality in the case of PoW.

In PoS, which is a succeeding algorithm, costs required to dominate coin resources is much higher than costs for dominating computer resources, and also, an attack is expected to cause a collapse in the price of the coins. Thus, in PoS, there is a high risk that coins dominated by spending costs lose their value after all. For these reasons, it has been believed that an attacker has low motives to carry out 51% attack and that PoS has a deterrent effect.

When the blockchain is regarded as one ledger recording the contents of all the transactions made by the participants, it is conceivable to apply the blockchain technology to various transactions of other than currency. For example, it is conceivable to use the blockchain as evidence of a contract agreement among a plurality of parties. It is possible to write evidence of a contract agreement onto the blockchain by causing transaction data to include the content of a contract as metadata and to be exchanged in connection with coin transactions.

However, it may be problematic when PoS is applied to the method of recording evidence of a contract in the blockchain. In conventional PoS for a virtual currency, when an attacker launches an attack aiming to make an illegitimate transaction of coins or to tamper with a history, the attack may cause a collapse in the price of the coins that they dominate, and this risk is working as a deterrent. However, in the method of recording evidence of a contract, the objective of an attacker is thought to be not to use coins illegitimately, but to cancel or rewrite the content of the contract written on the blockchain. In other words, when PoS is introduced for such a method, even if the value of the coins collapses as a result of successful cancellation of a contract, the cancellation may produce a profit which exceeds the value of the coins lost by the collapse. Due to such a possible scenario, no deterrent works like before, and a motive for an attack may be created.

Thus, an objective of the present invention is to provide a blockchain generation apparatus and a blockchain generation method that generate blockchain data, a blockchain verification apparatus and a blockchain verification method that verify blockchain data, and a program, with which it is possible to generate securer and more credible blockchain data for a digital virtual currency.

Solution to Problem

To solve the problem above, a first feature of the present invention relates a blockchain generation apparatus that generates new blockchain data by linking a new block to blockchain data which is a chain of blocks each including transactional datasets generated by a plurality of transaction generation apparatuses. The blockchain generation apparatus according to the first feature of the present invention comprises: a synchronizer that acquires shared data which includes the blockchain data and transaction datasets not included in the blockchain data; a parameter calculator that identifies a parameter type to be used for linkage of the new block, based on block approval method data specifying a blend pattern of a plurality of parameter types used for determination of presence or absence of qualification regarding linkage of a plurality of blocks in the blockchain data, and calculates a value for the identified parameter type based on transaction datasets which are among the transaction datasets in the blockchain data and are related to an identifier of a generating party using the blockchain generation apparatus; a block generation condition checker that determines whether the generating party is qualified to generate the new blockchain data, based on the value calculated by the parameter calculator; and a blockchain generator that tries to generate the new blockchain data by referring to the shared data when the block generation condition checker determines that the generating party is qualified, wherein an identifier of the blend pattern included in the block approval method data specifies a combination of the plurality of parameter types that conflict with each other.

The block approval method data may specify a blend pattern in which a first parameter type is repeated a first number of times and thereafter a second parameter type which conflicts with the first parameter type is repeated a second number of times.

The block approval method data may specify a blend pattern in which a combination of a predetermined number of successive parameter types includes at least one first parameter type and at least one second parameter type.

The predetermined number may be the number of blocks necessary for guaranteeing a true completion of a transaction for a certain block.

A second feature of this invention relates a blockchain generation method for generating new blockchain data by linking a new block to blockchain data which is a chain of blocks each including transactional datasets generated by a plurality of transaction generation apparatuses. The blockchain generation method according to the second feature comprises the steps of: a computer acquiring shared data which includes the blockchain data and transaction datasets not included in the blockchain data; the computer identifying a parameter type to be used for linkage of the new block, based on block approval method data specifying a blend pattern of a plurality of parameter types used for determination of presence or absence of qualification regarding linkage of a plurality of blocks in the blockchain data; the computer calculating a value for the identified parameter type based on transaction datasets which are among the transaction datasets in the blockchain data and are related to an identifier of a generating party using the computer; the computer determining whether the generating party is qualified to generate the new blockchain data, based on the value calculated by the calculation step; and the computer trying to generate the new blockchain data by referring to the shared data when it is determined that the generating party is qualified, wherein an identifier of the blend pattern included in the block approval method data specifies a combination of the plurality of parameter types that conflict with each other.

A third feature of this invention relates a blockchain verification apparatus that verifies blockchain data which is a chain of blocks each including transactional datasets generated by a plurality of transaction generation apparatuses. The blockchain verification apparatus according to the third feature comprising: a synchronizer that acquires shared data which includes the blockchain data; a block approval method verifier that identifies a parameter type to be used for linkage of the block based on block approval method data specifying a blend pattern of a plurality of parameter types used for determination of presence or absence of qualification regarding linkage of a plurality of blocks in the blockchain, and determines whether the blockchain data is generated based on the identified parameter type; a parameter calculator that calculates a value for the parameter type identified by the block approval method verifier, based on transaction datasets which are among the transaction datasets in the blockchain data and are related to an identifier of a generating party using an apparatus that generated the blockchain data; a block generation condition verifier that determines whether the generating party is qualified to generate the blockchain data, based on the value calculated by the parameter calculator; and a blockchain verifier that approves the blockchain data if the block approval method verifier determines that the blockchain data is generated based on the identified parameter type, and if the block generation condition verifier determines that the generating party is qualified to generate the blockchain data, wherein an identifier of the blend pattern included in the block approval method data specifies a combination of the plurality of parameter types that conflict with each other.

A forth feature relates a blockchain verification method for verifying blockchain data which is a chain of blocks each including transactional datasets generated by a plurality of transaction generation apparatuses. The blockchain verification method according to the forth feature comprising the steps of: a computer acquiring shared data which includes the blockchain data; the computer identifying a parameter type to be used for linkage of the block based on block approval method data specifying a blend pattern of a plurality of parameter types used for determination of presence or absence of qualification regarding linkage of a plurality of blocks in the blockchain, and determining whether the blockchain data is generated based on the identified parameter type; the computer calculating a value for the identified parameter type, based on transaction datasets which are among the transaction datasets in the blockchain data and are related to an identifier of a generating party using an apparatus that generated the blockchain data; the computer determining whether the generating party is qualified to generate the blockchain data, based on the value for the identified parameter type; and the computer approving the blockchain data if it is determined that the blockchain data is generated based on the identified parameter type, and if it is determined that the generating party is qualified to generate the blockchain data, wherein an identifier of the blend pattern included in the block approval method data specifies a combination of the plurality of parameter types that conflict with each other.

A fifth feature of this invention relates program that causes a computer to function as the apparatus according to any one of the first feature and the third feature.

Effect of the Invention

The present invention can provide a blockchain generation apparatus and a blockchain generation method that generate blockchain data, a blockchain verification apparatus and a blockchain verification method that verify blockchain data, and a program, with which it is possible to generate securer and more credible blockchain data for a digital virtual currency.

BRIEF DESCRIPTION OF THE DRAWINGS

FIG. 8 is a flowchart illustrating block verification processing performed by the blockchain verification apparatus according to the embodiment of the present invention.

FIG. 9 is a diagram illustrating examples of a blend pattern in block approval method data used in the transaction assistance system according to the embodiment of the present invention.

FIG. 10 is a diagram illustrating an example of how the number of transaction patterns is calculated in the transaction assistance system according to the embodiment of the present invention.

MODES FOR CARRYING OUT THE INVENTION

Next, an embodiment of the present invention is described with reference to the drawings. Throughout the drawings, the same or like components are denoted by the same or like reference signs.

(Transaction Assistance System)

Figure 1:
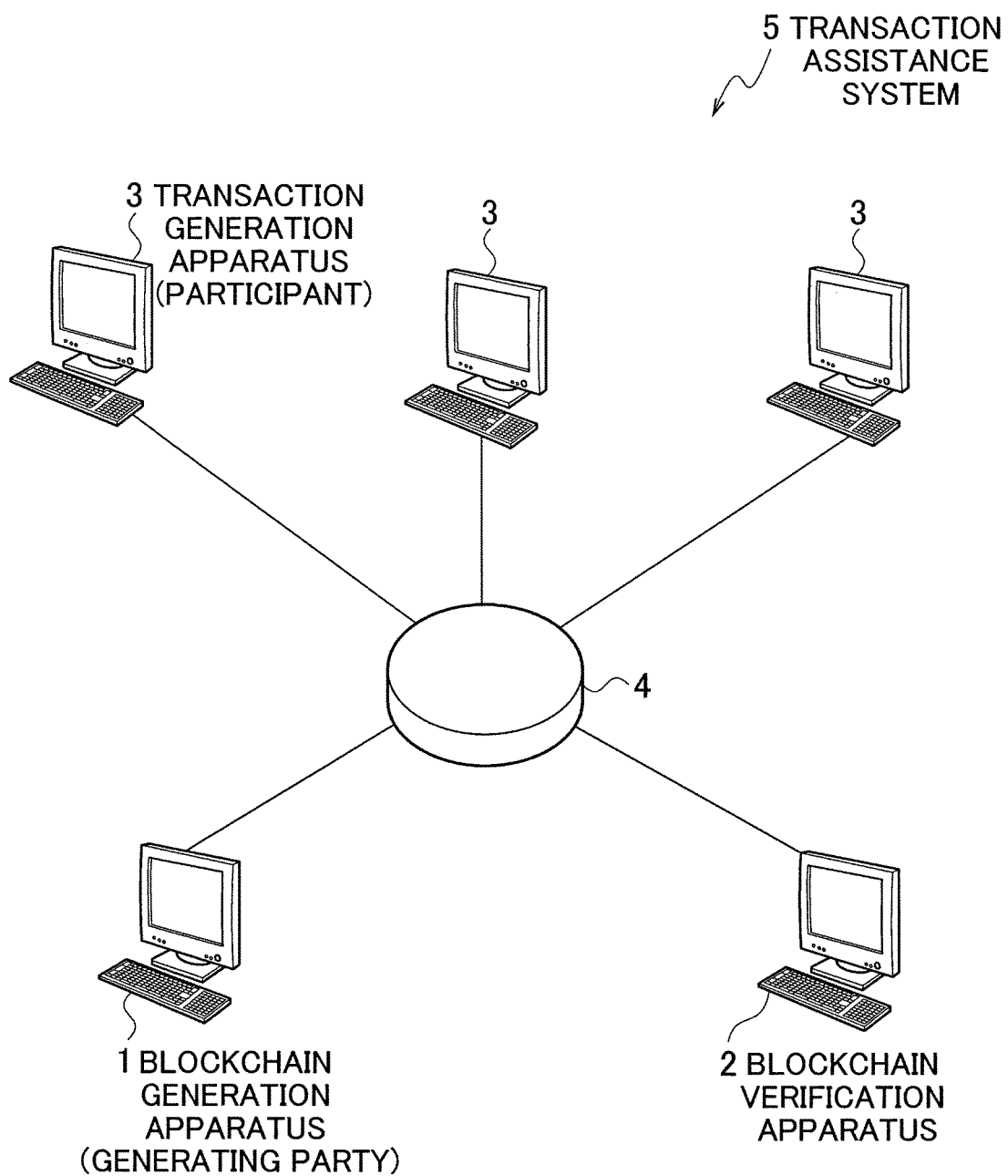
FIG. 1 is a diagram illustrating the system configuration of a transaction assistance system according to an embodiment of the present invention.

A transaction assistance system 5 according to the embodiment of the present invention is described with reference to FIG. 1. The transaction assistance system 5 includes a plurality of computers which are connected to one another autonomously in a decentralized manner via a P2P network 4 and communication controllers provided in the respective computers. The number of computers connected in the transaction assistance system 5 is not limited to what is illustrated in FIG. 1, which is merely an example.

The computers constituting the transaction assistance system 5 each have programs installed therein to implement a transaction of a digital virtual currency. Each computer acquires blockchain data and transaction datasets via the P2P network 4, and all the terminals participating in the network monitor illegitimate actions and share the only blockchain.

Each computer functions as a blockchain generation apparatus 1, a blockchain verification apparatus 2, or a transaction generation apparatus 3, depending on the role to play in each situation in the transaction assistance system 5.

In the embodiment of the present invention, a party that uses a virtual currency in the transaction assistance system 5 is referred to as a "participant", and a participant that uses the blockchain generation apparatus is referred to as a "generating party".

When meeting a predetermined condition, the blockchain generation apparatus 1 links a new block to existing blockchain data, which is a chain of blocks each including transaction datasets generated by a plurality of transaction generation apparatuses 3, and thereby generates new blockchain data. The new block includes data on a transaction generated after the existing blockchain is generated. The new blockchain data generated by the blockchain generation apparatus 1 is shared among the other terminals via the P2P network 4.

The blockchain verification apparatus 2 verifies the blockchain data generated by the blockchain generation apparatus 1. The blockchain verification apparatus 2 verifies blockchain data which is a chain of blocks each including transaction datasets generated by a plurality of transaction generation apparatuses 3. A verification result obtained by the blockchain verification apparatus 2 is shared with the other terminals via the P2P network 4.

In the transaction assistance system 5 according to the embodiment of the present invention, in order for a transaction of a given block to truly complete, the given block has to be followed by a certain number of blocks after being linked and approved, and each of these blocks has to be linked and verified. For example, when five successive blocks are validated and linked after a certain block A is approved and linked to the blockchain, or in other words, when six successive blocks are validated and linked, the transaction of the block A, which is the first one of the six blocks, is deemed truly completed. Herein, the number of blocks "6" used to approve true transaction completion is referred to as the "number of blocks for approval". This is based on the proof that the success rate of an attack decreases in an exponential manner as the gap in blocks expands (Satoshi Nakamoto, "Bitocoin: A Peer-to-Peer Electronic Cash System," [online] 2008, <URL: https://bitcoin.org/bitcoin.pdf> searched on the Internet on Oct. 20, 2015). In order for a chain generated by an attack to be accepted by the network in the end, the chain needs to be longer than a legitimate chain, and since the length of the legitimate chain becomes longer and longer while the attacker generates blocks, the attacker cannot narrow the gap unless the attacker has a block generation rate accounting for more than half of the system (i.e., the block generation rate of a legitimate chain or higher).

The transaction generation apparatus 3 generates a transaction dataset to be included in a block by transaction of a virtual currency, a contract, or the like. The transaction dataset generated by the transaction generation apparatus 3 is shared with the other terminals via the P2P network 4.

Figure 2:
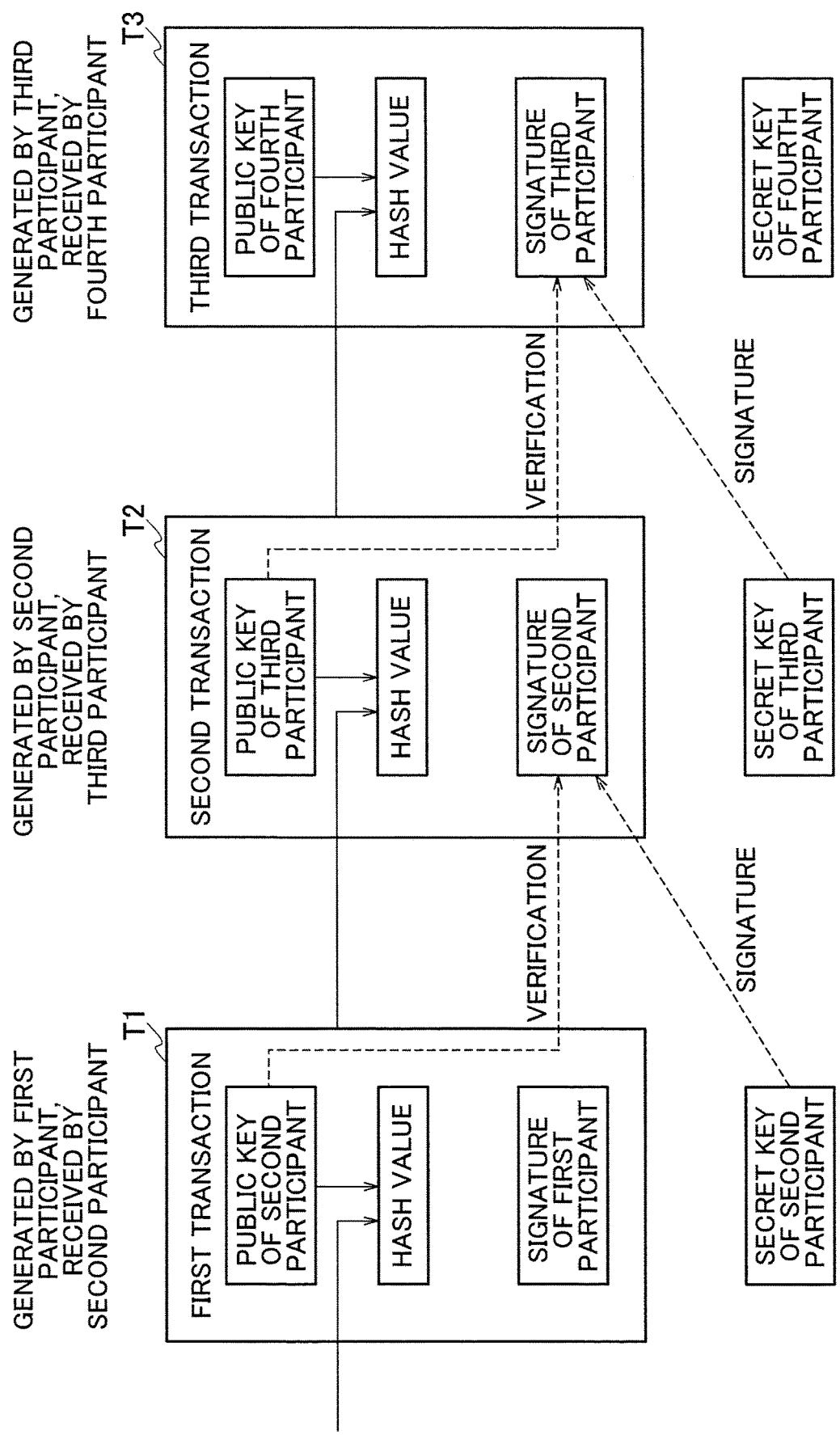
FIG. 2 is a diagram illustrating signatures for a general virtual currency.

With reference to FIG. 2, a description is given of a transaction where a second participant pays a coin to a third participant in the transaction assistance system 5 according to the embodiment of the present invention. The transaction generation apparatus 3 generates data on a second transaction T2 by applying a cryptographic hash function to data combining data on the latest transaction (a first transaction T1) and a public key of the third participant, and attaching a signature using a secret key of the second participant. The third participant receiving the coin checks whether the coin is passed from a legitimate owner by verifying the signature on the second transaction T2 using the public key of the receiver (the second participant) of the previous transaction (the first transaction T1) and re-computing a hash value. Data on each transaction includes the content of the transaction such as the value of a virtual currency transferred and an address which corresponds to the public key of the participant generating the transaction.

Figure 3:
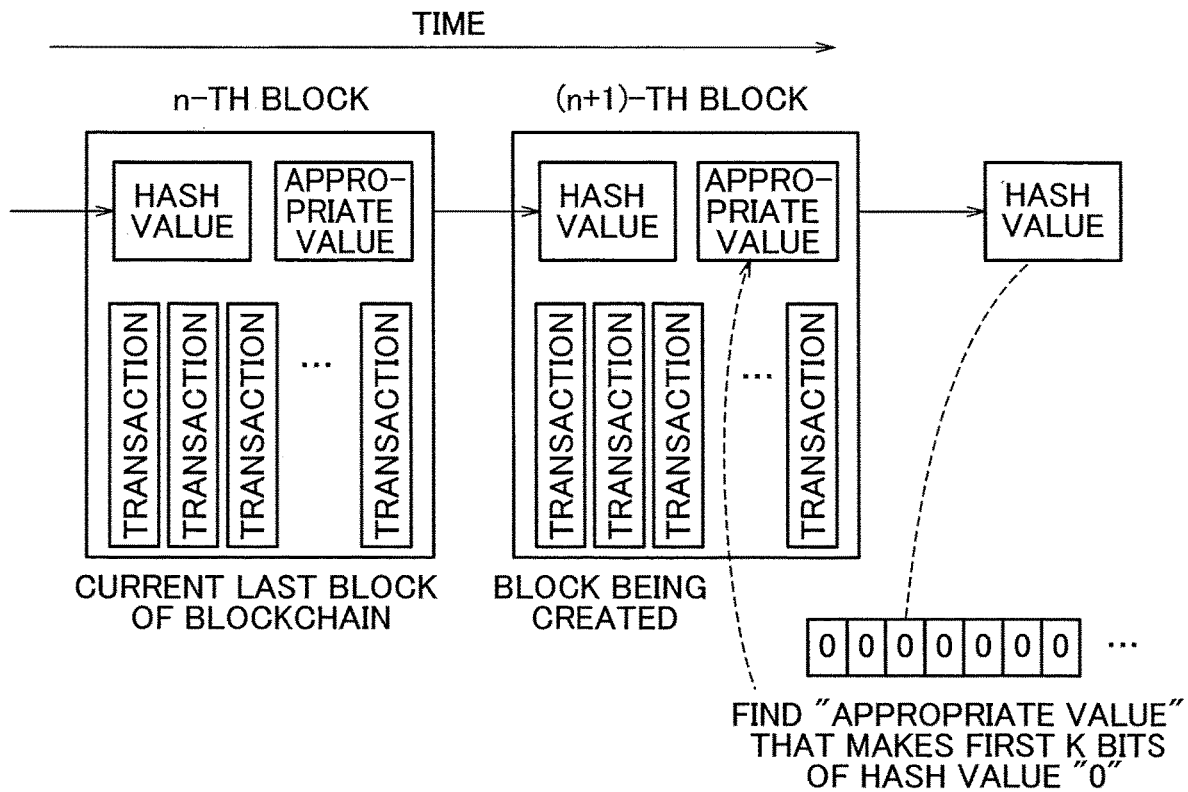
FIG. 3 is a diagram illustrating blockchain for a general virtual currency.

As illustrated in FIG. 3, the plurality of transaction datasets generated as illustrated in FIG. 2 are bundled into a block by the blockchain generation apparatus 1 under a predetermined condition, linked to the existing blockchain by the blockchain generation apparatus 1, and shared among the computers. When generating a new block (the (n+1)-th block), the blockchain generation apparatus 1 collects transaction datasets yet to be included in the blockchain, and includes the collected transaction datasets and the hash value (256 bits) of the last block (the n-th block) of the current blockchain, in the new block (the (n+1)-th block). Then, the blockchain generation apparatus 1 searches for an appropriate value to include in the currently-generated block (the (n+1)-th block), the appropriate value being a value that makes the first k bits of a hash value obtained by application of a cryptographic hash function (SHA-256) to the currently-generated block (the (n+1)-th block) all zeros. Once the appropriate value is found, the block (the (n+1)-th block) including the appropriate value is linked to the end of the current blockchain, and is broadcast. The difficulty of obtaining the appropriate value is appropriately determined by changing the numerical value of k in "k bits", which is a condition used for the calculation of the appropriate value.

After that, the blockchain verification apparatus 2 verifies the blockchain data sent from the blockchain generation apparatus 1, and shares the verification result with the other terminals.

(Transaction Generation Apparatus)

Figure 4:
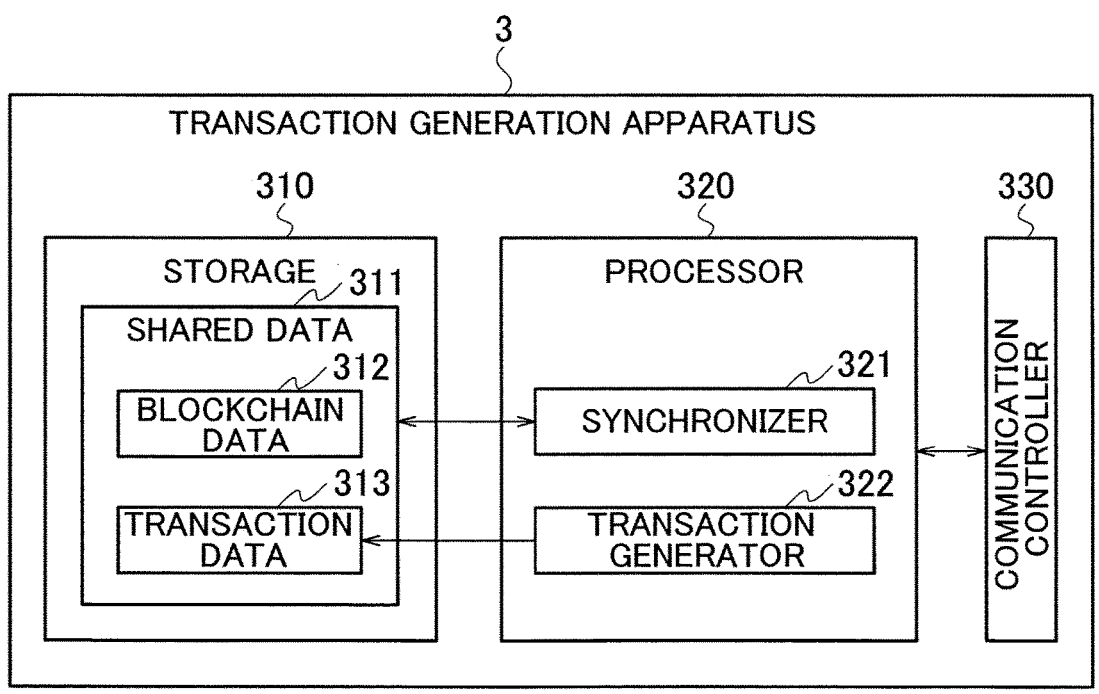
FIG. 4 is a diagram illustrating the hardware configuration and functional blocks of a transaction generation apparatus according to the embodiment of the present invention.

The transaction generation apparatus 3 is described with reference to FIG. 4. The transaction generation apparatus 3 is a general computer including a storage 310, a processor 320, and a communication controller 330. By executing programs for the general computer to implement predetermined functions, the transaction generation apparatus 3 implements the functions illustrated in FIG. 4.

The storage 310 stores shared data 311. The shared data 311 includes blockchain data 312 and transaction data 313 yet to be included in the blockchain. The shared data 311 is data shared in the transaction assistance system 5 illustrated in FIG. 1.

The processor 320 includes a synchronizer 321 and a transaction generator 322.

Via the P2P network 4, the synchronizer 321 acquires the shared data 311 including the blockchain data 312 and the transaction data 313 yet to be included in the blockchain. The synchronizer 321 acquires the shared data 311 by communicating with the other apparatuses via the P2P network 4, and shares the shared data 311 synchronized with the up-to-date data.

Further, when the blockchain data 312 or the transaction data 313 is updated within the computer, the synchronizer 321 broadcasts the updated data to the other apparatuses via the P2P network 4. Thereby, up-to-date data generated within the computer is shared with the other computers.

The transaction generator 322 carries out a transaction of a virtual currency or a contract, and generates transaction data on this transaction. The generated transaction data is also sent to the other computers via the P2P network 4 and shared with them.

(Blockchain Generation Apparatus)

The blockchain generation apparatus 1 is described with reference to FIG. 5. The blockchain generation apparatus 1 is a general computer including a storage 110, a processor 120, and a communication controller 130. By executing programs for the general computer to implement predetermined functions, the blockchain generation apparatus 1 implements the functions illustrated in FIG. 5.

The storage 110 stores shared data 111, block approval method data 114, and parameter data 115. The shared data 111 is like the shared data 311 in the transaction generation apparatus 3 described with reference to FIG. 4 and includes blockchain data 112 and transaction data 113.

The block approval method data 114 specifies a blend pattern of a plurality of parameter types used for determination of qualification regarding linkage of a plurality of blocks in the blockchain data 112. The block approval method data 114 allows each of a plurality of successive blocks in the blockchain data 112 to be associated with a parameter type used to link the block. In the embodiment of the present invention, the plurality of parameter types specified by the block approval method data conflict with one another.

The block approval method data 114 is shared between the blockchain generation apparatus 1 and the blockchain verification apparatus 2 by, for example, being written in the programs used to implement the blockchain generation apparatus 1 and the blockchain verification apparatus 2 according to the embodiment of the present invention.

It is preferable in the embodiment of the present invention that whether a generating party on the blockchain generation apparatus 1 is qualified to generate and link a block is determined based not on a single parameter type, but on any of a plurality of parameter types. In the embodiment of the present invention, an approval method for each of successive blocks is one of a plurality of parameter types blended, and the block approval method data 114 specifies which parameter type to use to generate each block.

In the embodiment of the present invention, the "plurality of parameter types" used as the methods for approving a plurality of blocks are conflicting parameter types. The "conflicting parameter types" are parameter types having a relation where domination of one type of resource does not affect domination of another type of resource. For example, the "number of coins saved" and the "number of coins spent" are conflicting parameter types since it is difficult to meet both of these conditions.

With PoW and PoS, PoW is a parameter related to external resources, whereas PoS is a parameter related to internal resources. For this reason, it is difficult for a single block generating party to meet both conditions, and PoW and PoS are therefore conflicting parameter types.

Although the embodiment of the present invention describes cases where two conflicting parameter types are used, there may be three conflicting parameter types if the three parameter types can be in a conflicting relation with one another.

Further, in the embodiment of the present invention, the conflicting parameter types may be the "number of coins saved" and the "number of transaction path patterns". The "number of transaction path patterns" is an index of the variety of transactions a generating party has carried out by spending coins. The "number of coins saved" is, on the other hand, about holding on to coins. The "number of coins saved" and the "number of transaction path patterns" hence have conflicting properties of holding a coin and spending a coin, and therefore it is difficult for a single block generating party to dominate these parameters at the same time. Hence, these parameter types, the "number of coins saved" and the "number of transaction path patterns", conflict with each other.

Specific examples of the block approval method data 114 will be given later in detail.

In the parameter data 115, a value for the parameter type used to approve a block newly generated by the blockchain generation apparatus 1 is set. The parameter data 115 is calculated by a parameter calculator 122 and stored in the storage 110.

The processor 120 includes a synchronizer 121, the parameter calculator 122, a block generation condition checker 125, and a blockchain generator 126. The synchronizer 121 is the same as the synchronizer 321 of the transaction generation apparatus 3 described with reference to FIG. 4.

Based on the blockchain data 112 and the block approval method data 114, the parameter calculator 122 identifies a parameter type to be used for linkage of a new block. The parameter calculator 122 refers to the block approval method data 114 and identifies the approval method (parameter type) for a new block to be linked such that the approval methods for blocks in the blockchain data 112 and the approval method for the new block to be linked match the blend pattern specified by the block approval method data 114. In this operation, based on certain bits in data on each of already-linked blocks the parameter types of which need to be identified for linkage of a new block, the parameter calculator 122 identifies the parameter types used for the linkage of those blocks.

Further, the parameter calculator 122 calculates a value for the identified parameter type based on transaction datasets which are in the blockchain data 112 and related to the identifier of the generating party using the blockchain generation apparatus 1.

A detailed description will be given later as to how the parameter calculator 122 determines a parameter type to be used for approval of qualification of a generating party trying to add a new block.

The parameter calculator 122 has calculators that perform calculations for respective parameter types specified by a blend pattern. For example, in a case where the conflicting parameter types set in a blend pattern in the block approval method data 114 are the number of coins saved and the number of transaction patterns, the parameter calculator 122 includes a coin saving amount calculator 123 that calculates the number of coins saved and a transaction pattern count calculator 124. The parameter calculator 122 may include a calculator that calculates a different parameter type depending on the parameter types specified by the blend pattern in the block approval method data 114.

Based on the value calculated by the parameter calculator 122, the block generation condition checker 125 determines whether the generating party of the new blockchain is qualified to generate new blockchain data. If the parameter calculator 122 calculates a value for a general parameter type such as the number of coins saved, the number of coins spent, PoW, or PoS, the block generation condition checker 125 uses a general method to determine whether the generating party is qualified to generate new blockchain data.

A detailed description will be given later as to the processing performed by the transaction pattern count calculator 124 and the processing to determine whether the generating party is qualified to generate new blockchain data, based on the number of transaction patterns.

If the block generation condition checker 125 determines that the generating party is qualified, the blockchain generator 126 refers to the shared data 111 and tries to generate a new blockchain. Specifically, the blockchain generator 126 tries to find the "appropriate value" illustrated in FIG. 3 by using the value set in the parameter data 115. If the appropriate value is found, the blockchain generator 126 generates a new block using the appropriate value. In this operation, in a predetermined bit in the new block generated, the blockchain generator 126 sets the identifier of the parameter type used to generate this block. The blockchain generator 126 links the newly generated block to the end of the existing blockchain data 112 to generate new blockchain data, and updates the shared data 111. If new blockchain is successfully generated, data on the new blockchain is broadcast to the P2P network to be shared with the other terminals.

There may be a case where another apparatus generates a block and shares a new blockchain while the blockchain generator 126 is searching for an appropriate value. In this case, the blockchain generator 126 stops searching for the appropriate value with the old blockchain, and repeats searching for an appropriate value with the newly shared blockchain.

Figure 6:
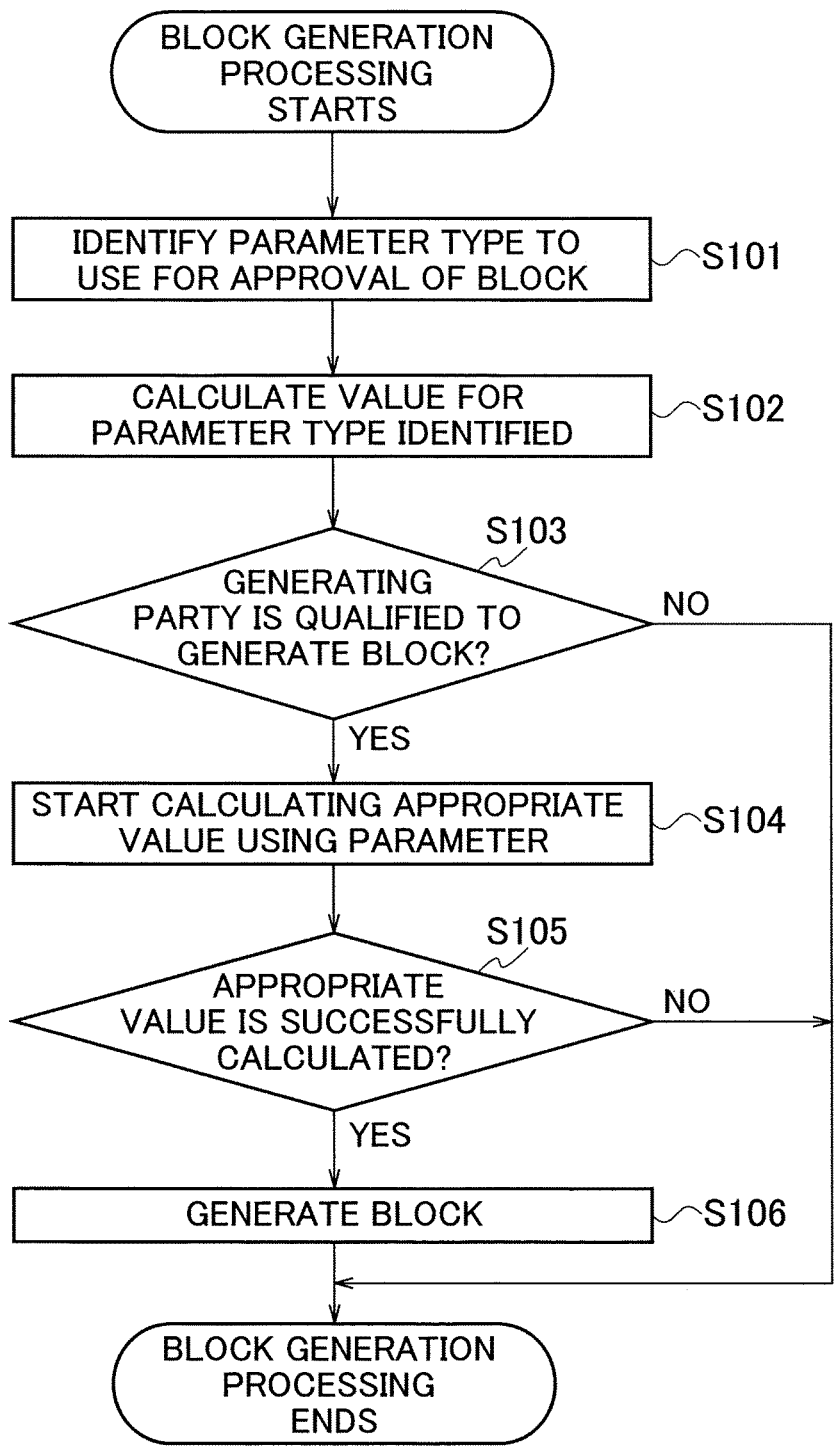
FIG. 6 is a flowchart illustrating block generation processing performed by the blockchain generation apparatus according to the embodiment of the present invention.

With reference to FIG. 6, a description is given of a blockchain generation method performed by the blockchain generation apparatus 1.

First in Step S101, the blockchain generation apparatus 1 refers to the block approval method data 114 and identifies a parameter type to be used for approval of generation of a new block. In Step S102, the blockchain generation apparatus 1 refers to the shared data 111 and calculates a value for the parameter type identified in Step S101.

In Step S103, based on the value calculated in Step S102, the blockchain generation apparatus 1 determines whether the generating party on the blockchain generation apparatus 1 is qualified to generate the block. If it is determined that the generating party is not qualified to generate the block, the processing ends.

If, on the other hand, it is determined in Step S103 that the generating party is qualified to generate a block, in Step S104 the blockchain generation apparatus 1 starts calculating an appropriate value based on the parameter calculated in Step S102. If an appropriate value is successfully calculated, the blockchain generation apparatus 1 generates a new block using the calculated appropriate value, and stores new blockchain data in which the new block is linked to the existing blockchain.

(Blockchain Verification Apparatus)

The blockchain verification apparatus 2 is described with reference to FIG. 7. The blockchain verification apparatus 2 is a general computer including a storage 210, a processor 220, and a communication controller 230. By executing programs for the general computer to implement predetermined functions, the blockchain verification apparatus 2 implements the functions illustrated in FIG. 8.

The storage 210 stores shared data 211, block approval method data 214, and parameter data 215. The shared data 211 is like the shared data 311 of the transaction generation apparatus 3 described with reference to FIG. 4 and includes blockchain data 212 and transaction data 213. Note that the blockchain verification apparatus 2 does not have to have the transaction data 213 since the blockchain verification apparatus 2 is to verify the existing blockchain data 212.

The block approval method data 214 and the parameter data 215 are the same as the block approval method data 114 and the parameter data 115 described with reference to FIG. 5.

The processor 220 includes a synchronizer 221, a block approval method verifier 222, a parameter calculator 223, a block generation condition verifier 226, and a blockchain verifier 227. The synchronizer 221 is the same as the synchronizer 321 of the transaction generation apparatus 3 described with reference to FIG. 4.

The block approval method verifier 222 identifies a parameter type to be used for linkage of the block based on the block approval method data 214, and determines whether the blockchain data 212 is generated based on the identified parameter type. The block approval method verifier 222 determines whether the approval methods for the blocks in the blockchain data 212 match the blend pattern specified by the block approval method data 214. In this operation, based on certain bits of data on each of blocks which are in the blockchain data 212 to be verified and the parameter types of which need to be identified for checking of agreement with the blend pattern, the block approval method verifier 222 identifies the parameter types used for the linkage of those blocks.

A detailed description will be given later as to the processing to determine whether the parameter types used to generate the blocks in the blockchain data 212 are the parameter types specified by the block approval method data 214.

The parameter calculator 223 calculates a value for the parameter type identified by the block approval method verifier 222, based on transaction datasets which are in the blockchain data 212 and are related to the identifier of the generating party using the apparatus that generated the blockchain data 212. The calculated value is stored in the storage 210 as the parameter data 215.

Like the parameter calculator 122 of the blockchain generation apparatus 1 described with reference to FIG. 5, the parameter calculator 223 includes calculators that calculate values for respective parameter types, such as a coin saving amount calculator 224 and a transaction pattern count calculator 225.

Based on the value calculated by the parameter calculator 223, the block generation condition verifier 226 determines whether the blockchain generating party is qualified to generate the blockchain data 212.

If the parameter calculator 223 calculates a value for a general parameter type such as the number of coins saved, the number of coins spent, PoW, or PoS, the block generation condition verifier 226 uses a general method to determine whether the generating party is qualified to generate new blockchain data.

A detailed description will be given later as to the processing performed by the transaction pattern count calculator 225 and the processing to determine whether the generating party is qualified to generate new blockchain data, based on the number of transaction patterns.

The blockchain verifier 227 verifies the blockchain based on results obtained by the block approval method verifier 222 and the block generation condition verifier 226. Specifically, the blockchain verifier 227 approves the blockchain data 212 when the block approval method verifier 222 determines that the blockchain data 212 is generated based on the parameter types identified and the block generation condition verifier 226 determines that the generating party is qualified to generate the blockchain data 212. The blockchain verifier 227 notifies the other terminals of a result of the verification. Upon receipt of a verification result indicating disapproval, a terminal performs, for example, processing to notify other terminals that the blockchain is not legitimate.

With reference to FIG. 8, a description is given of the blockchain verification method performed by the blockchain verification apparatus 2.

First in Step S201, the blockchain verification apparatus 2 refers to the block approval method data 214 and identifies the parameter type used for generation of the new block.

In Step S202, the blockchain verification apparatus 2 determines whether the block in the blockchain data 212 is generated with the parameter type identified in Step S201. If it is determined that the block is not generated with the parameter type identified, in Step S206 the blockchain verification apparatus 2 determines not to approve the blockchain data.

If, on the other hand, it is determined that the block is generated with the parameter type identified, in Step S203 the blockchain verification apparatus 2 refers to the shared data 111 and calculates a value for the parameter type identified in Step S201.

In Step S204, based on the value calculated in Step S203, the blockchain generation apparatus 1 determines whether the generating party on the terminal that generated the block in the blockchain data 212 is qualified to generate the block. If it is determined that the generating party is not qualified to generate the block, in Step S206 the blockchain verification apparatus 2 determines not to approve the blockchain data.

If, on the other hand, the generating party is qualified to generate the block, in Step S205 the blockchain verification apparatus 2 determines to approve the blockchain data. Further, in Step S207, the blockchain verification apparatus 2 notifies the other terminals of a result of the verification.

(Blend Pattern)

The block approval method data 114 referred to by the blockchain generation apparatus 1 and the block approval method data 214 referred to by the blockchain verification apparatus 2 are the same data. The block approval method data specifies, for example, any of the blend patterns of approval methods illustrated in FIG. 9.

A linkage of squares in the examples illustrated in FIG. 9 represents a linkage of successive blocks in blockchain data. A hollow square indicates that the parameter type used for generation and linkage of the block is a "first parameter type", and an obliquely hatched square indicates that the parameter type used for generation and linkage of the block is a "second parameter type". Here, the first parameter type and the second parameter type are in a conflicting relation with each other.

With reference to FIG. 9, a detailed description is given of blend patterns specified by the block approval method data 114. The blend patterns exemplified in FIG. 9 are roughly classified as follows:

Blend Pattern A: The first parameter type is repeated a first number of times, and thereafter the second parameter type is repeated a second number of times (FIGS. 9(a) to 9(c)).

Blend Pattern B: A predetermined number of successive parameter types repeated include at least one first parameter type and at least one second parameter type (FIGS. 9(d) and 9(e)).

In the blend pattern of FIG. 9(a), the first parameter type is repeated a predetermined number of times (1), and thereafter the second parameter type is repeated a predetermined number of times (1). In this case, the block approval method data 114 contains the identifier of the blend pattern of FIG. 9(a). Blocks in the blockchain are newly generated and linked to the blockchain while being approved by the first parameter type and the second parameter type alternately and repeatedly.

If the block approval method illustrated in FIG. 9(a) is set, the blockchain generation apparatus 1 uses a parameter type different from the parameter type used for the generation of the last block to determine whether the generating party is qualified to generate the block. Further, when the last two blocks match the blend pattern of FIG. 9(a), the blockchain verification apparatus 2 determines that the last block is generated based on the block approval method data 214.

In the blend pattern in FIG. 9(b), the first parameter type is repeated a first number of times (N=3), and thereafter the second parameter type is repeated a second number of times (1). In this case, the block approval method data 114 includes the first number of times (N) besides the identifier of the blend pattern of FIG. 9(b). Blocks in the blockchain are newly generated and linked to the blockchain after being repeatedly approved by the first parameter type N times and then approved by the second parameter type.

In a case where the block approval method illustrated in FIG. 9(b) is set, if the parameter types used for the generation of the last N blocks are all the first parameter type, the blockchain generation apparatus 1 uses the second parameter type for generation of the new block. Otherwise, i.e., if the parameter type used for the generation of the last block is the second parameter type, or if the parameter types used for the generation of the last N blocks include the second parameter type, the blockchain generation apparatus 1 uses the first parameter type for generation of the new block. Further, when the last (N+1) blocks match the blend pattern of FIG. 9(b), the blockchain verification apparatus 2 determines that the last block is generated based on the block approval method data 214.

In the blend pattern in FIG. 9(c), the first parameter type is repeated a first number of times (N=3), and thereafter the second parameter type is repeated a second number of times (M=2). In this case, the block approval method data 114 includes the first number of times (N) and the second number of times (M) besides the identifier of the blend pattern of FIG. 9(c). Blocks in the blockchain are newly generated and linked to the blockchain after being repeatedly approved by the first parameter type N times and then repeatedly approved by the second parameter type M times.

In a case where the block approval method illustrated in FIG. 9(c) is set, if the parameter types used for the generation of the last M blocks are all the second parameter type, the blockchain generation apparatus 1 uses the first parameter type for generation of the new block. If the parameter types used for the generation of the last N blocks are all the first parameter type, the blockchain generation apparatus 1 uses the second parameter type for generation of the new block. Otherwise, the blockchain generation apparatus 1 uses the parameter type used for the generation of the last block. Further, when the last (N+M) blocks match the blend pattern of FIG. 9(c), the blockchain verification apparatus 2 determines that the last block is generated based on the block approval method data 214.

In the blend pattern of FIG. 9(d), a predetermined number of successive parameter types repeated (N=6) include at least one first parameter type and at least one second parameter type. In this case, the block approval method data 114 contains the predetermined number of times (N) besides the identifier of the blend pattern of FIG. 9(d). For blocks in the blockchain, a parameter type is determined based on the parameter types used for the generation of the last (N−1) blocks, and a new block generated with the parameter type determined is linked to the blockchain.

Ina case where the block approval method illustrated in FIG. 9(d) is set, if the parameter types used for the generation of the last (N−1) blocks are all the first parameter type, the blockchain generation apparatus 1 uses the second parameter type for generation of the new block. If the parameter types used for the generation of the last (N−1) blocks are all the second parameter type, the blockchain generation apparatus 1 uses the first parameter type for generation of the new block. Otherwise, the blockchain generation apparatus 1 selects the first parameter type or the second parameter type based on a predetermined algorithm such as a random number or a draw, generates a new block with the selected parameter type, and links the new block to the blockchain. Further, when the last N blocks include at least each one of the conflicting parameter types, the blockchain verification apparatus 2 determines that the last block is generated based on the block approval method data 214.

FIG. 9(e) is a modification of the example illustrated in FIG. 9(d), and is a method for setting the number of blocks for approval to a predetermined number of successive blocks (N). The number of blocks for approval is the number of successively generated blocks necessary for a given block to be approved for a true completion of a transaction. Specifically, the number of blocks for approval is "6" if a given block A generated and linked is approved for a true completion of a transaction after five blocks are linked thereafter. Setting the number of blocks for approval as the predetermined number of successive blocks (N) ensures that the blocks are approved by a blend of a plurality of conflicting parameter types. Thus, an attack by a malicious participant can be avoided more surely.

Note that the parameter type used for the generation of each of the blocks in the blockchain data 112 is preferably specified in each of the blocks in the blockchain. For example, the identifier of the parameter type used for generation of a given block is set in a predetermined bit within the block. Based on data on a predetermined bit in each of the already-linked blocks the parameter types of which need to be identified for linkage of a new block, the blockchain generation apparatus 1 identifies the parameter types used for the linkage of such blocks. Here, the "blocks the parameter types of which need to be identified for linkage of a new block" differ depending on the identifier of the blend pattern specified by the block approval method data, configuration information such as N and M, and the like. Further, the blockchain verification apparatus 2 identifies the parameter types used for the linkage of the blocks necessary for checking of agreement with the blend pattern in the blockchain data 212 to be verified, based on the data indicated by a predetermined bit in each of those blocks, and determines whether those parameter types match the blend pattern. Here, the "blocks necessary for checking of agreement with the blend pattern" differ depending on the identifier of the blend pattern specified by the block approval method data, configuration information such as N and M, and the like.

(Transaction Pattern Count Calculator)

Figure 5:
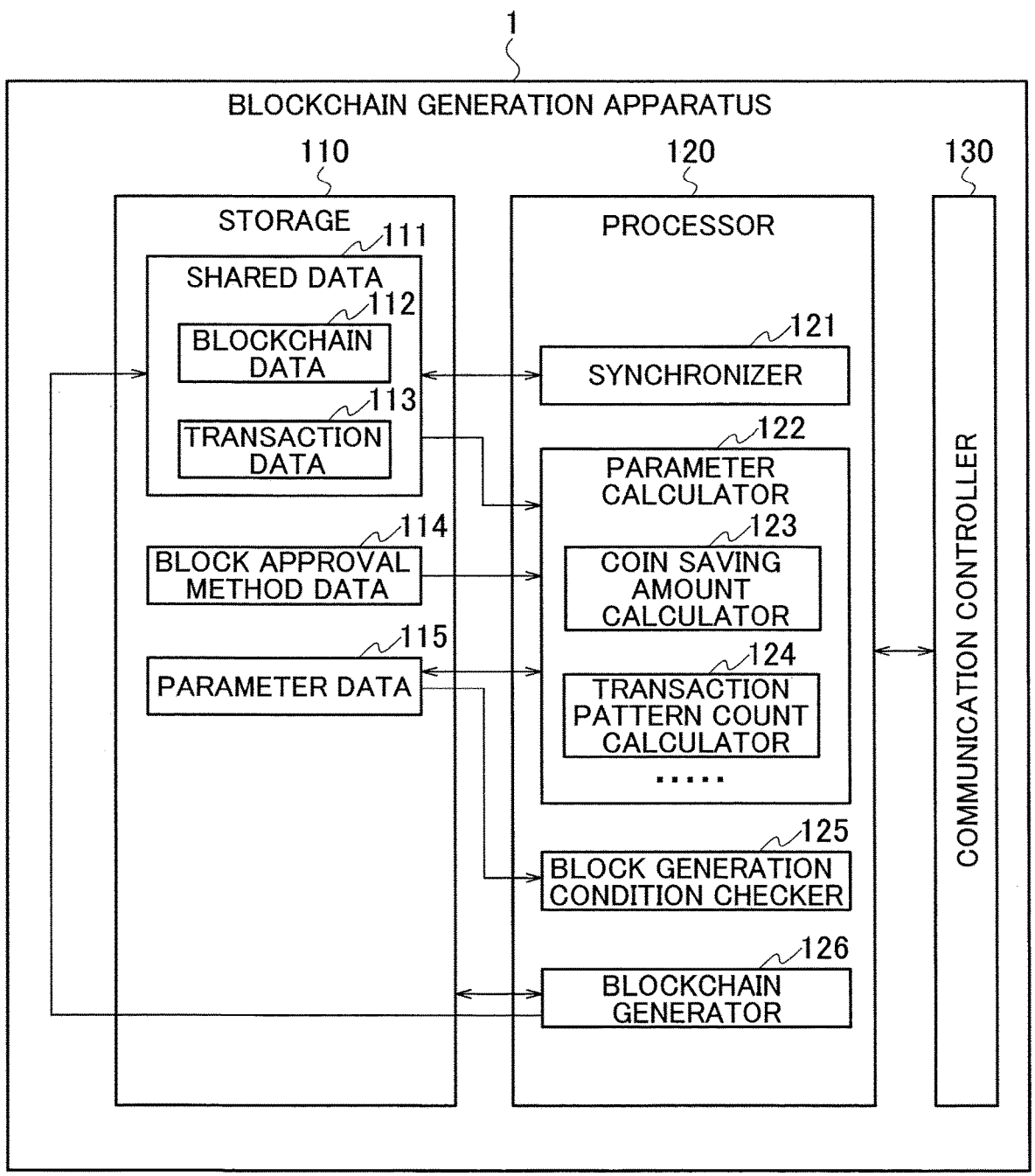
FIG. 5 is a diagram illustrating the hardware configuration and functional blocks of a blockchain generation apparatus according to the embodiment of the present invention.
Figure 7:
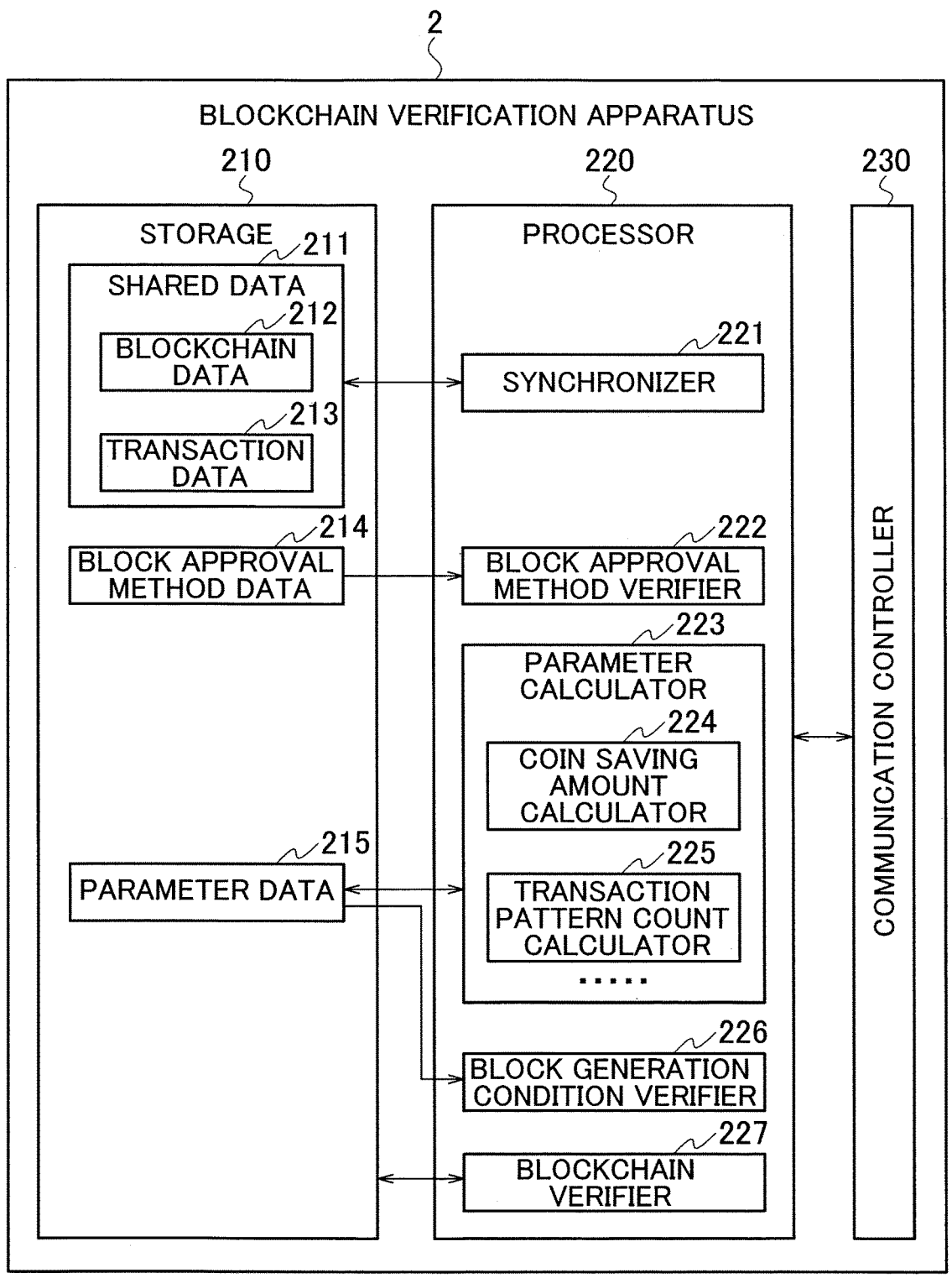
FIG. 7 is a diagram illustrating the hardware configuration and functional blocks of a blockchain verification apparatus according to the embodiment of the present invention.

A description is given of the transaction pattern count calculator 124 of the blockchain generation apparatus 1 in FIG. 5 and the transaction pattern count calculator 225 of the blockchain verification apparatus 2 in FIG. 7.

The transaction pattern count calculator 124 (the transaction pattern count calculator 225) calculates the number of transaction patterns for a generating party using the blockchain generation apparatus 1, based on transaction datasets which are in the blockchain data 112 and are related to the generating party. Here, the "number of transaction patterns" is an index of trustworthiness of a generating party.

The number of transaction patterns corresponds to a trustworthiness score calculated focusing on the point that a transaction is conducted with trust on the transaction partner built by revealing each other's identities and knowing who the transaction partner is. It is expected that a participant who has conducted transactions with many nodes has been trusted by many nodes. If such an approved, highly trusted participant conducts 51% attack, he or she will be identified and lose trust socially as well. Thus, a collapse in trust is thought to serve as a deterrent to an attack. The "number of transaction patterns" can be obtained with reference to the blockchain data 112 by scoring how many nodes a participant has conducted transactions with. Further, the "number of transaction patterns" is a value obtained by spending a coin in a transaction, and therefore is used as a parameter type conflicting with the "number of coins saved".

Here, a "transaction" is identified by a transaction dataset generated by the transaction generation apparatus 3, and includes not only transfer of a virtual currency, but also a contract made by using the blockchain as evidence of the contract agreed among a plurality of parties. A contact made by using the blockchain as evidence includes a contact of sale, purchase, transfer, application, licensing, and the like regarding an article, a task, or the like, and is signed by two or more individuals or bodies.

In PoS, the "number of coins saved" serves as cost. Thus, when a generating party generating a block in PoS is approved in a situation where the value of a contract whose evidence is left in the blockchain is equal to or higher than the value corresponding to the number of coins saved by the block generating party, then the generating party has a motive to launch an attack even though it may cost the generating party the amount of cost saved. Thus, the embodiment of the present invention employs the number of transaction path patterns as a parameter type used for approval of a generating party generating a block. Thereby, in order to increase the number of transaction patterns, a participant has to spend coins and conduct various transactions to gain trust, and therefore this may serve as a deterrent to demotivate a block generating party who has gained trust to launch an attack.

The number of transaction patterns according to the embodiment of the present invention is described with reference to FIG. 10. As illustrated in FIG. 10(a), when a group of path patterns issued by a certain participant in the past is denoted as a and the number of nodes included in a path pattern p included in this a is denoted as $n_{p,a}$, the sum of the numbers of nodes in all the path patterns in a (the number of transaction patterns: score) is as expressed by Formula (1).

In this case, the number of transaction patterns is the total number of the identifiers of transaction partners in all combinations of the identifiers of transaction partners in transaction datasets related to the identifier of a block generating party (a generating party using the blockchain generation apparatus 1). As a specific example, assume a case illustrated in FIG. 10(b) where a participant A has previously engaged in a transaction with only B, a transaction with only C, and a transaction with only B and C. The numbers of nodes in these respective transactions (the total numbers of the identifiers of transaction partners) are 1, 1, and 2, respectively, and thus the number of transaction patterns in this case is "4".

Alternatively, the number of transaction patterns may be the number of unique identifiers of transaction partners in transaction datasets related to the identifier of the block generating party. Specifically, in the case illustrated in FIG. 10(b) where a participant A has previously engaged in a transaction with only B, a transaction with only C, and a transaction with only B and C, the transaction partners of the participant A are A, B, and C, and thus the number of transaction patterns in this case is "3".

Note that in the calculation of the number of transaction patterns, the number of transaction patterns is calculated in such a manner as not to increase even if the generating party engages in a plurality of transactions with the same transaction partner or the same combination of transaction partners. This can avoid a fraud where a plurality of malicious participants cooperate to try to increase the number of transaction patterns.

FIG. 10(*c*) illustrates an example of a conditional expression for an address of a possible block generating party, the expression being based on the number of transaction patterns (score(a)) calculated above. FIG. 10(*c*) is a conditional expression for an address of a possible block generating party based on PoS, in which the number of coins saved is converted to the number of transaction patterns.

Figure 11:
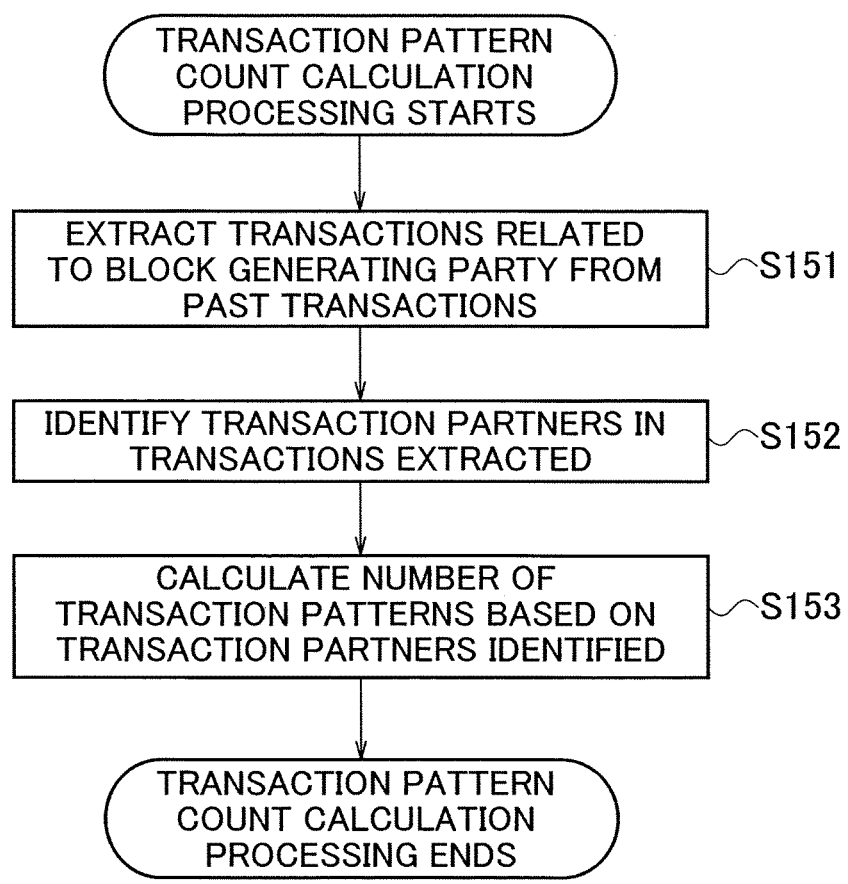
FIG. 11 is a flowchart illustrating transaction pattern count calculation processing performed by a transaction pattern count calculator in the transaction assistance system according to the embodiment of the present invention.

With reference to FIG. 11, a description is given of transaction pattern count calculation processing by the transaction pattern count calculator 124. Note that the transaction pattern count calculator 225 performs the same processing.

First, in Step S151, the blockchain generation apparatus 1 extracts transactions related to the block generating party (the participant using the blockchain generation apparatus 1) from the past transactions in the blockchain data 112.

In Step S152, the blockchain generation apparatus 1 identifies transaction partners' identifiers in the transactions extracted in Step S151. In Step S153, the blockchain generation apparatus 1 calculates the number of transaction patterns for the block generating party based on the transaction partners' identifiers identified in Step S152.

As described above, based on one of a plurality of conflicting parameter types, the blockchain generation apparatus 1 according to the embodiment of the present invention determines whether the block generating party is qualified to link a new block to the blockchain. In the embodiment of the present invention, the blockchain is generated with each block generated based on a blend pattern in which the plurality of conflicting parameter patterns are blended. The "plurality of conflicting parameter types" are in a relation where domination of one of the resources does not affect domination of the other one of the resources, i.e., a relation where it is difficult for the same person to meet both conditions at the same time.

Then, when the parameter types used for the generation of a plurality of blocks in the blockchain match the blend pattern in which the plurality of conflicting parameter types are blended, the blockchain verification apparatus 2 according to the embodiment of the present invention approves the blockchain data.

With this, the embodiment of the present invention can prevent a malicious generating party from making an attack by linking blocks successively.

Further, when successive blocks are generated in the blockchain as many as the number of blocks for approval based on the plurality of conflicting parameter types, it can be prevented that a true completion of a transaction is assured with blocks being successively linked by a malicious generating party.

Furthermore, the embodiment of the present invention uses the number of transaction patterns as a trustworthiness score of a generating party to determine whether the generating party is qualified to link a new block. The number of transaction patterns is based on a track record built over a long time, and a collapse in this trust serves as a deterrent to launching an attack. Moreover, the approval for block generation based on the number of transaction patterns can be used not only for transfer of a virtual currency, but also when the blockchain is used to leave evidence of a contract agreed among a plurality of parties.

Also, when the number of transaction patterns and the number of coins saved, which conflicts with the number of transaction patterns, are set as conflicting parameter types, it can be prevented that a malicious generating party makes an attack by linking successive blocks.

OTHER EMBODIMENTS

The present invention has been described using the above embodiment. However, it should not be understood that the description and drawings which constitute part of this disclosure limit the present invention. From this disclosure, various alternative embodiments, examples, and operation techniques will be easily found by those skilled in the art.

For example, the blockchain generation apparatus 1 and the blockchain verification apparatus 2 described in the embodiment of the present invention may be configured on a single piece of hardware as illustrated respectively in FIGS. 5 and 7, or may be configured on a plurality of pieces of hardware depending on their functions and the number of processes. Alternatively, they may be implemented on an existing information processing system.

The present invention naturally includes various embodiments which are not described herein. Accordingly, the technical scope of the present invention should be determined only by the matters to define the invention in the scope of claims regarded as appropriate based on the description.

EXPLANATION OF THE REFERENCE NUMERALS

1 blockchain generation apparatus
2 blockchain verification apparatus
3 transaction generation apparatus
4 P2P network
5 transaction assistance system
110, 210, 310 storage
111, 211, 311 shared data
112, 212, 312 blockchain data
113, 213, 313 transaction data
114, 214 block approval method data
115, 215 parameter data
120, 220, 320 processor
121, 221, 321 synchronizer
122, 223 parameter calculator
123, 224 coin saving amount calculator
124, 225 transaction pattern count calculator
125 block generation condition checker
126 blockchain generator
130, 230, 330 communication controller
222 block approval method verifier
226 block generation condition verifier
227 blockchain verifier

The invention claimed is:

1. A blockchain generation apparatus that includes a processor and storage and that generates new blockchain data by linking a new block to blockchain data which is a chain of a plurality of blocks each including transactional datasets generated by a plurality of transaction generation apparatuses, the blockchain generation apparatus comprising:

a synchronizer, that uses the processor, and that acquires shared data which includes the blockchain data and transaction datasets not included in the blockchain data;

a parameter calculator, that uses the processor, and that identifies a parameter type to be used for linkage of the new block based on a blend pattern that defines a repeating pattern of blocks of a first parameter type and blocks of a second parameter type, and based on parameter types of a plurality of blocks in the blockchain data, wherein the plurality of blocks in the blockchain data includes at least two repetitions where a first repetition includes a first block of the first parameter type followed by a second block of the second parameter type, and a second repetition includes a subsequent second block of the second parameter type followed by a subsequent first block of the first parameter type, wherein each of the parameter types specifies a block approval method data, and calculate a value for the identified parameter type based on transaction datasets which are among the transaction datasets and are related to an identifier of a generating party using the blockchain generation apparatus, wherein when the identified parameter type is number of coins saved, the value is based on a number of coins saved by the generating party;

a block generation condition checker, that uses the processor, and that determines whether the generating party is qualified to generate the new block, based on the calculated value for the identified parameter type; and a blockchain generator, that uses the processor, and that generates the new block when the block generation condition checker determines that the generating party is qualified, wherein the new block includes an identifier of the parameter type used to generate the new block, wherein the block approval method data in the storage specifies the blend pattern, and fulfilling requirements of the first parameter type prevents fulfilling requirements of the second parameter type, and wherein the block approval method data specifies the blend pattern in which the first parameter type is repeated a first number of times and thereafter the second parameter type which conflicts with the first parameter type is repeated a second number of times.

2. The blockchain generation apparatus according to claim 1, wherein
the block approval method data specifies the blend pattern in which a combination of a predetermined number of successive parameter types includes at least one first parameter type and at least one second parameter type.

3. The blockchain generation apparatus according to claim 2, wherein
the predetermined number is the number of blocks necessary for guaranteeing a true completion of a transaction for a certain block.

4. A blockchain verification apparatus that includes a processor and storage, wherein the processor: acquires shared data which includes blockchain data which is a chain of blocks each including transactional datasets generated by a plurality of transaction generation apparatuses;

identifies a parameter type for verification of a new block based on a blend pattern that defines a repeating pattern of blocks of a first parameter type and blocks of a second parameter type, and based on parameter types of a plurality of blocks in the blockchain data, and determines whether the blockchain data is generated based on the identified parameter type, wherein a plurality of blocks in the blockchain data includes at least two repetitions where a first repetition includes a first block of the first parameter type followed by a second block of the second parameter type, and a second repetition includes a subsequent second block of the second parameter type followed by a subsequent first block of the first parameter type, wherein each of the parameter types specifies a block approval method data, wherein the block approval method data specifies the blend pattern in which the first parameter type is repeated a first number of time and thereafter the second parameter type which conflicts with the first parameter type is repeated a second number of times;

calculates a value for the identified parameter type, based on transaction datasets which are among the transaction datasets and are related to an identifier of a generating party using an apparatus that generated the blockchain data, wherein when the identified parameter type is number of coins saved, the value is based on a number of coins saved by the generating party;

determines whether the generating party is qualified to generate the new block, based on the calculated value for the identified parameter type; and approves the blockchain data including the new block when the processor determines that the new block was generated based on the identified parameter type, and when the processor determines that the generating party is qualified to generate the new block, wherein fulfilling requirements of the first parameter type prevents fulfilling requirements of the second parameter type.

5. A non-transitory computer readable medium having stored thereon a program that causes a computer to function as the apparatus according to claim 1.

6. The blockchain generation apparatus according to claim 1, wherein when the identified parameter type is number of coins spent, the value is based on a number of coins spent by the generating party.

7. The blockchain verification apparatus according to claim 4, wherein when the identified parameter type is number of coins spent, the value is based on a number of coins spent by the generating party.

* * * * *